United States Patent
Rodriguez Bravo et al.

(10) Patent No.: US 11,457,032 B2
(45) Date of Patent: Sep. 27, 2022

(54) MANAGING DATA AND DATA USAGE IN IOT NETWORK

(71) Applicant: KYNDRYL, INC., New York, NY (US)

(72) Inventors: Cesar Augusto Rodriguez Bravo, Alajuela (CR); Edgar Adolfo Zamora Duran, Heredia (CR); Craig M. Trim, Ventura, CA (US); Franz Friedrich Liebinger Portela, Heredia (CR)

(73) Assignee: KYNDRYL, INC., New York, NY (US)

( * ) Notice: Subject to any disclaimer, the term of this patent is extended or adjusted under 35 U.S.C. 154(b) by 292 days.

(21) Appl. No.: 16/421,156

(22) Filed: May 23, 2019

(65) Prior Publication Data

US 2020/0374304 A1 Nov. 26, 2020

(51) Int. Cl.
*H04L 67/303* (2022.01)
*H04L 9/40* (2022.01)
*H04L 43/065* (2022.01)

(52) U.S. Cl.
CPC ........ *H04L 63/1425* (2013.01); *H04L 43/065* (2013.01); *H04L 63/0245* (2013.01); *H04L 67/303* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,691,175 B1 | 2/2004 | Lodrige | |
| 8,107,973 B1 * | 1/2012 | Sjothun | G01C 21/20 455/414.3 |
| 8,161,111 B2 | 4/2012 | Espelien | |
| 8,176,095 B2 | 5/2012 | Murray | |
| 8,813,186 B2 * | 8/2014 | Hegg | H04L 63/0876 713/168 |
| 10,083,291 B2 | 9/2018 | James | |

(Continued)

OTHER PUBLICATIONS

"China is Watching Us, or at Least Chinese Cameras Are", Newser, Nov. 13, 2017, 2 pages, <http://www.newser.com/story/251508/china-is-watching-us-or-at-least-chinese-cameras-are.html>.

(Continued)

*Primary Examiner* — Joshua Joo
(74) *Attorney, Agent, or Firm* — Ken Han; Andrew M. Calderon; Roberts Calderon Safran & Cole, P.C.

(57) ABSTRACT

In an approach, a processor receives from a network device a request. A processor obtains from a database a device profile for the network device. A processor determines whether the device profile of the network device has a data usage pattern related to data identified by a data identifier. In response to determining the device profile has a related data usage pattern, a processor receives the related data usage pattern from the database. In response to determining the device profile does not have a related data usage pattern, a processor obtains a device type profile from the database. A processor classifies the data usage request based on at least one of the device profile and the device type profile. A processor executes a security action based on the classification of the data usage request. A processor stores the data usage request and executed security action to the database.

16 Claims, 4 Drawing Sheets

(56) References Cited

U.S. PATENT DOCUMENTS

| | | | | |
|---|---|---|---|---|
| 10,721,122 | B1* | 7/2020 | Argenti | H04L 41/0806 |
| 2007/0083928 | A1* | 4/2007 | Mattsson | G06F 21/552 |
| | | | | 726/22 |
| 2009/0054002 | A1* | 2/2009 | Urushihara | H04W 28/16 |
| | | | | 455/67.13 |
| 2010/0037293 | A1 | 2/2010 | Stjohns | |
| 2010/0157802 | A1* | 6/2010 | Casey | H04L 63/0263 |
| | | | | 370/235 |
| 2010/0261488 | A1 | 10/2010 | Little | |
| 2014/0019618 | A1* | 1/2014 | Hegli | H04L 63/102 |
| | | | | 709/225 |
| 2015/0296499 | A1* | 10/2015 | Huang | H04W 72/048 |
| | | | | 370/329 |
| 2016/0352739 | A1* | 12/2016 | McGovern | H04L 63/10 |
| 2017/0201385 | A1 | 7/2017 | Kravitz | |
| 2017/0230369 | A1* | 8/2017 | Chanda | G06F 21/10 |
| 2017/0237762 | A1* | 8/2017 | Ogawa | H04L 63/1441 |
| | | | | 726/23 |
| 2017/0272940 | A1 | 9/2017 | Ghosh | |
| 2017/0289176 | A1 | 10/2017 | Chen | |
| 2017/0289184 | A1 | 10/2017 | C | |
| 2017/0366977 | A1* | 12/2017 | Girdhar | H04W 12/08 |
| 2018/0007099 | A1* | 1/2018 | Ein-Gil | G06F 9/468 |
| 2018/0375887 | A1* | 12/2018 | Dezent | H04L 63/1458 |
| 2019/0392421 | A1* | 12/2019 | Boding | G06Q 20/4016 |
| 2020/0213116 | A1* | 7/2020 | Fattal | H04L 63/0807 |
| 2020/0285898 | A1* | 9/2020 | Dong | G06N 3/08 |

OTHER PUBLICATIONS

"Knock, knock, knocking on your network's door—security and IoT device enrollment", NCipher Security Blog, May 13, 2016, <https://www.thales-esecurity.com/blogs/2016/may/security-and-iot-device-enrollment>.

Brown, Eric, "Who Needs the Internet of Things?", Linux.com, Sep. 13, 2016, <https://www.linux.com/news/who-needs-internet-things>.

Dickson, Ben, "How blockchain can change the future of IoT", TechTalks, Nov. 20, 2016, Venture Beat, <https://venturebeat.com/2016/11/20/how-blockchain-can-change-the-future-of-iot/>.

Flaherty, Nick, "7 Controllers for Internet of Things", Nov. 18, 2014, EE Times, <http://www.eetimes.com/document.asp?doc_id=1324663>.

Kliem, et al., "The Internet of Things Resource Management Challenge", 2015 IEEE International Conference on Data Science and Data Intensive Systems, 2015, pp. 483-490, <http://ieeexplore.ieee.org/document/7396547/>.

Press, Gil, 6 Hot Internet of Things (IoT) Security Technologies, Mar. 20, 2017, Forbes Media, LLC, <https://www.forbes.com/gilpress/2017/03/20/6-hot-internet-of-things-iot-security-techynologies/#69f16d8c1b49>.

Sadeghi, et al., "Security and Privacy Challenges in Industrial Internet of Things", DAC '15, Jun. 7-11, 2015, ACM, <http://dx.doi.org/10.1145/2744769.2747942>.

Silva, et al., "A symbiotic resources sharing IoT platform in the smart cities context", 2015 IEEE Tenth International Conference on Intelligent Sensors, Sensor Networks and Information Processing (ISSNIP), 2015, pp. 1-6, <http://ieeexplore.ieee.org/document/7106922/>.

Strumpf, et al., "Surveillance Cameras Made by China Are Hanging All Over the U.S.", Nov. 12, 2017, The Wall Street Journal.

International Search Report and Written Opinion, International Application No. PCT/20206267, International Filing Date May 5, 2020.

* cited by examiner

MANAGING DATA AND DATA USAGE IN IOT NETWORK

BACKGROUND

The present invention relates generally to the field of IoT networks, and more particularly to managing data and data usage in an IoT network.

Internet of Things (IoT) refers to the concept of extending internet connectivity beyond conventional computing platforms such as personal computers and mobile devices, and into any range of traditionally non-internet-enabled physical devices and everyday objects. Embedded with electronics, internet connectivity, and other forms of hardware (such as sensors), these devices and objects can communicate and interact with others over the Internet, and the devices and objects can be remotely monitored and controlled.

The definition of IoT has evolved due to convergence of multiple technologies, real-time analytics, machine learning, commodity sensors, and embedded systems. Traditional fields of embedded systems, wireless sensor networks, control systems, automation (including home and building automation), and others all contribute to enabling the IoT. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

The IoT concept has faced prominent criticism, especially in regard to privacy and security concerns related to these devices and their intention of pervasive presence. IoT devices can be sloppily installed with default passwords that are publicly available on the Internet. Security experts say "backdoors" that allow someone outside the IoT network to bypass security protections are often difficult to identify. Such vulnerabilities can be accidental, the result of flaws in the software's original design or in updates.

SUMMARY

Aspects of an embodiment of the present invention disclose a method, computer program product, and computer system for monitoring usage data in an IoT network. A processor receives from a network device a request. A processor obtains from a database a device profile for the network device. A processor determines whether the device profile of the network device has a data usage pattern related to data identified by a data identifier. In response to determining the device profile has a related data usage pattern, a processor receives the related data usage pattern from the database. In response to determining the device profile does not have a related data usage pattern, a processor obtains a device type profile from the database. A processor classifies the data usage request based on at least one of the device profile and the device type profile. A processor executes a security action based on the classification of the data usage request. A processor stores the data usage request and executed security action to the database.

DETAILED DESCRIPTION

Figure 1:
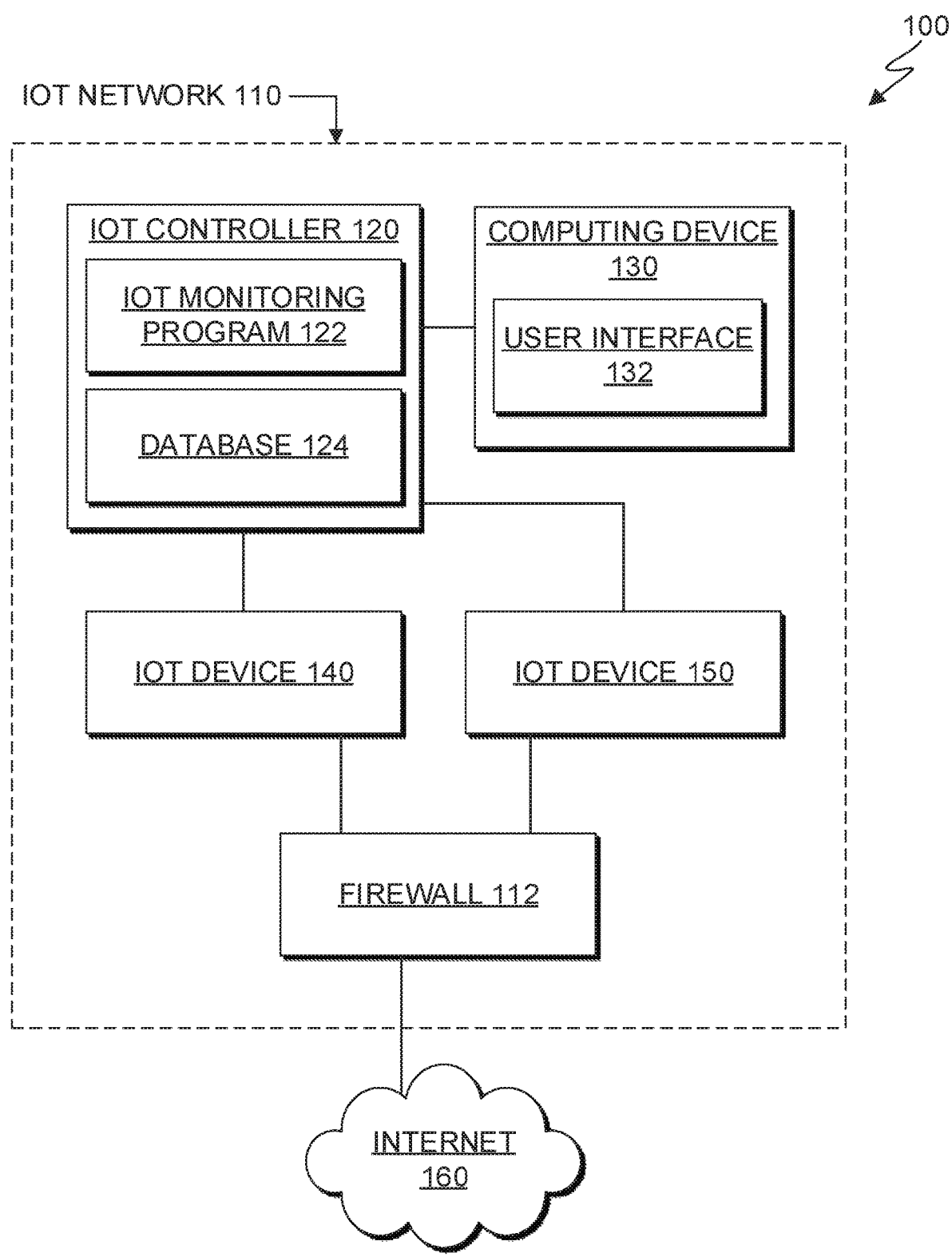
FIG. 1 depicts a block diagram of an IoT computing environment, in accordance with an embodiment of the present invention.

Embodiments of the present invention recognize that data privacy is one of the biggest challenges for IoT networks. The IoT concept has faced prominent criticism, especially in regard to privacy and security concerns related to these devices and their intention of pervasive presence. IoT devices have become the targets of more cyberattacks. IoT devices can be sloppily installed with default passwords that are publicly available on the Internet. An IoT device can be created with a "backdoor" that may put an entire network at risk. Security experts say "backdoors" that allow someone outside the IoT network to bypass security protections are often difficult to identify. Such vulnerabilities can be accidental, the result of flaws in the software's original design or in updates. This is troublesome because, within present day IoT networks, IoT devices themselves hold the data that the IoT devices need and use.

Embodiments of the present invention segregate the data based on context of the data to create categories (i.e., money, appliances, health, security, etc.). Each category has a centralized database with the data for that category (i.e., credit cards, etc.) and one blockchain to record, audit, and manage each request of data. Each category is based on an IoT device's role, function, and/or data managed. The categories can be suggested by the system, by a user, or a combination of both. IoT devices can be enrolled in a category during initial setup of the IoT device done by an IoT controller and approved by an owner of the IoT network.

Embodiments of the present invention utilize blockchain technologies to securely audit and control the requests of data of the IoT devices. An additional federated or private blockchain can record inter-category transactions to keep the integrity of the records. The federated blockchain transaction can also be recorded in the blockchains involved for an extra layer of data security so that the inter-category transaction data can be recovered even after an error on the federated blockchain (i.e., corruption, deletion, forgery, etc.).

Embodiments of the present invention provide a mechanism to control and manage access to sensitive data on an IoT network based on data segregation by context type and/or user. Embodiments of the present invention further provide a mechanism to audit the access to sensitive data on an IoT network based on blockchain technologies. Embodiments of the present invention further provide alerts when an IoT device of one category tries to access data from another category.

Another related concern is the abuse of data on IoT devices within the same network. For example, a smart lock changes the days of access for service personnel or a freezer changes a pattern of use of a credit card number to buy milk. Embodiments of the present invention provide a system that can monitor and prevent data usage abuse from an IoT device within an IoT network. Embodiments of the present invention can keep a profile for each IoT device within the IoT network, in which the profile is associated with sensitive data usage by that device and stores usage patterns identified by the system. Embodiments of the present invention can trigger a notification/alert if an intended access and/or use of data (i.e., sensitive data) by an IoT device surpasses a normal usage or request threshold and/or does not match a usage pattern, e.g., an increased number of requests of credit card data, request to open ports, increased bandwidth, etc. Embodiments of the present invention can execute a predetermined security action and/or can send a notification/alert to a user and listen for user feedback to block or allow the intended use of data. The user feedback can be used to retrain the system and stored in a profile for an IoT device.

Embodiments of the present invention generate data usage models using machine-learning to identify data usage patterns to determine whether an intended use of data surpasses a normal usage or request threshold and/or does not match a usage pattern. Data considered to generate a data usage model includes, but is not limited to, an IoT device identification (ID), an IoT device type (e.g., a smart lock), sensitive data (e.g., a schedule for days of access for service personnel), an operation to use the sensitive data (e.g., granting access for service personnel based on the schedule), a type of operation (e.g., granting access), previous operations of the same type (e.g., history of granting access for service personnel role), date of previous and current operations, time of previous and current operations, weather and other context data of previous and current operations, affected resources (e.g., smart locks on first floor), and involved users (e.g., service personnel users).

Embodiments of the present invention classify an intended use of data in one of three classes: normal use, block, or request approval. This classification is based on data usage models and any identified data usage patterns for the intended use of data. If the intended use of data is classified as block or request approval, embodiments of the present invention send a notification/alert to a user referencing the intended use of data. If the intended use of data is classified as normal use but with low confidence, some embodiments of the present invention send a notification/alert that requests user feedback. Embodiments of the present invention send a notification/alert to an owner of the IoT network requesting user feedback in the form of a three-part feedback response, (1) an ID for the intended use of data by the IoT device, (2) a correct classification, and (3) approval or disapproval to complete the intended use of data by the IoT device.

Embodiments of the present invention can detect suspicious intended use of data on IoT devices, e.g., a refrigerator asking for credit card data, a camera asking for data from other sensors like motion detection, etc. Embodiments of the present invention can prevent cyber attackers from getting user personal data such as user behavior data to detect patterns of a user's behavior.

The present invention will now be described in detail with reference to the Figures.

FIG. 1 depicts a functional block diagram illustrating IoT computing environment 100, in accordance with an embodiment of the present invention. FIG. 1 provides only an illustration of one embodiment of the present invention and does not imply any limitations with regard to the environments in which different embodiments may be implemented. In the depicted embodiment, IoT computing environment 100 includes IoT controller 120, computing device 130, IoT device 140, and IoT device 150 interconnected over IoT network 110. IoT computing environment 100 may include additional servers, computers, IoT devices, or other devices not shown.

IoT network 110 operates as a computing network that can be, for example, a local area network (LAN), a wide area network (WAN), or a combination of the two, and can include wired, wireless, or fiber optic connections. In an embodiment, IoT network 110 is a private/secure network that includes firewall 112 to block unauthorized access to or from IoT network 110 while permitting outward communication. Firewall 112 can be implemented in either hardware or software form, or a combination of both. In an embodiment, IoT network 110 can be connected to the Internet, depicted as Internet 160, but firewall 112 prevents unauthorized Internet users from accessing IoT network 110. In general, IoT network 110 can be any combination of connections and protocols that will support communications between IoT controller 120, computing device 130, IoT device 140, and IoT device 150.

IoT controller 120 operates to run IoT monitoring program 122 and store and/or send data using database 124. In an embodiment, IoT controller 120 can send data from database 124 to computing device 130, IoT device 140, and/or IoT device 150. In an embodiment, IoT controller 120 can receive data in database 124 from computing device 130, IoT device 140, and/or IoT device 150. In some embodiments, IoT controller 120 may be a management server, a web server, or any other electronic device or computing system capable of receiving and sending data. In some embodiments, IoT controller 120 may be a laptop computer, tablet computer, netbook computer, personal computer (PC), a desktop computer, a smart phone, or any programmable electronic device capable of communicating with computer device 130, IoT device 140, and IoT device 150 via IoT network 110. In other embodiments, IoT controller 120 represents a server computing system utilizing multiple computers as a server system, such as in a cloud computing environment. IoT controller 120 may include components as described in further detail in FIG. 4.

Computing device 130 operates to run user interface 132 for interacting with an owner and/or authorized user of IoT network 110. In an embodiment, computing device 130 can send and/or receive data from IoT controller 120. In some embodiments, computing device 130 may be a management server, a web server, or any other electronic device or computing system capable of receiving and sending data. In some embodiments, computing device 130 may be a laptop computer, tablet computer, netbook computer, personal computer (PC), a desktop computer, a smart phone, or any programmable electronic device capable of communicating with IoT controller 120 via IoT network 110. Computing device 130 may include components as described in further detail in FIG. 4.

User interface 132 operates as a local user interface on computing device 130 of IoT monitoring program 122. In an embodiment, user interface 132 is a local mobile application user interface of IoT monitoring program 122. In an embodiment, user interface 132 enables an owner of IoT network 110 to authorize addition of IoT devices to IoT network 110, to authorize categorizes of IoT devices and sensitive data, and to list authorized users of IoT network 110. In an embodiment, user interface 132 enables an owner of IoT network 110 to view and respond to, in the form of user feedback, notifications/alerts sent by IoT monitoring program 122.

IoT monitoring program 122 operates as a program for monitoring and preventing data usage abuse from an IoT device, such as IoT device 140 within an IoT network, such as IoT network 110. In an embodiment, IoT monitoring program 122 receives a request for data usage, determines whether to allow execution of the data usage based on data usage patterns, and, in some scenarios, sends a notification/alert to an owner of IoT network 110 based on the determination. In the depicted embodiment, IoT monitoring program 122 resides on IoT controller 120. In other embodiments, IoT monitoring program 122 may reside on computing device 130, or another computing device (not shown), provided that IoT monitoring program 122 has access to IoT network 110.

Database 124 operates as a repository for IoT data, device type profiles, device profiles, data usage patterns, and data usage models. A database is an organized collection of data. Database 124 can be implemented with any type of storage device capable of storing data and configuration files that can be accessed and utilized by IoT controller 120, such as a database server, a hard disk drive, or a flash memory. In an embodiment, database 124 is accessed by IoT monitoring program 122, IoT controller 120, and/or computing device 130 to store IoT data, device type profiles, device profiles, data usage patterns, and data usage models. In another embodiment, database 124 is accessed by IoT monitoring program 122, IoT controller 120, and/or computing device 130 to access the IoT data, device type profiles, device profiles, data usage patterns, and data usage models. In the depicted embodiment, database 124 resides on IoT controller 120. In another embodiment, database 124 may reside elsewhere within IoT computing environment 100 provided database 124 has access to IoT network 110.

IoT data includes any data used by an IoT device, stored on an IoT device, and sent or received by an IoT device, which can include sensitive IoT data. Sensitive IoT data includes, but is not limited to, finger prints, credit card numbers, personal identification numbers, medical records, passwords, access codes, etc. IoT monitoring program 122 monitors the usage of sensitive IoT data.

A device type profile is a profile for one type of IoT device that includes, but is not limited to, a default set of data describing the kind of device, the type of data that kind of device uses, the frequency of use of data that kind of device uses, and the general intended use executed with the data used by that kind of device. IoT monitoring program 122 considers a device type profile when adding a new IoT device to IoT network 110 and when there is not a stored data usage pattern for a data usage request. Device types include, but are not limited to, physical security devices, smart appliances, personal devices, entertainment devices, etc.

A device profile includes, but is not limited to, an IoT device ID, an IoT device type (e.g., a smart lock), data usage patterns for that IoT device, and data usage models for that IoT device. Data usage patterns include, but are not limited to, the type of data, frequency of use of data, and history of uses of data by the IoT device. IoT monitoring program 122 creates a device profile for each IoT device in IoT network 110. IoT monitoring program 122 considers data usage patterns and data usage models in a device profile when determining whether to execute a data usage request by an IoT device.

IoT devices 140 and 150 operate as a physical devices and/or everyday objects that are embedded with electronics, Internet connectivity, and other forms of hardware (i.e., sensors). In general, IoT devices can communicate and interact with other IoT devices over the Internet while being remotely monitored and controlled. In the depicted embodiment, IoT devices 140 and 150 are monitored and controlled by IoT monitoring program 122 on IoT controller 120 and the owner through user interface 132 on computing device 130. Types of IoT devices include, but are not limited to, smart locks, garage doors, refrigerators, freezers, ovens, mobile devices, smart watches, A/C units, washer/dryer units, smart TVs, virtual assistance devices, and any other smart home devices. In several embodiments, IoT network 110 contains additional IoT devices (not shown).

Figure 2:
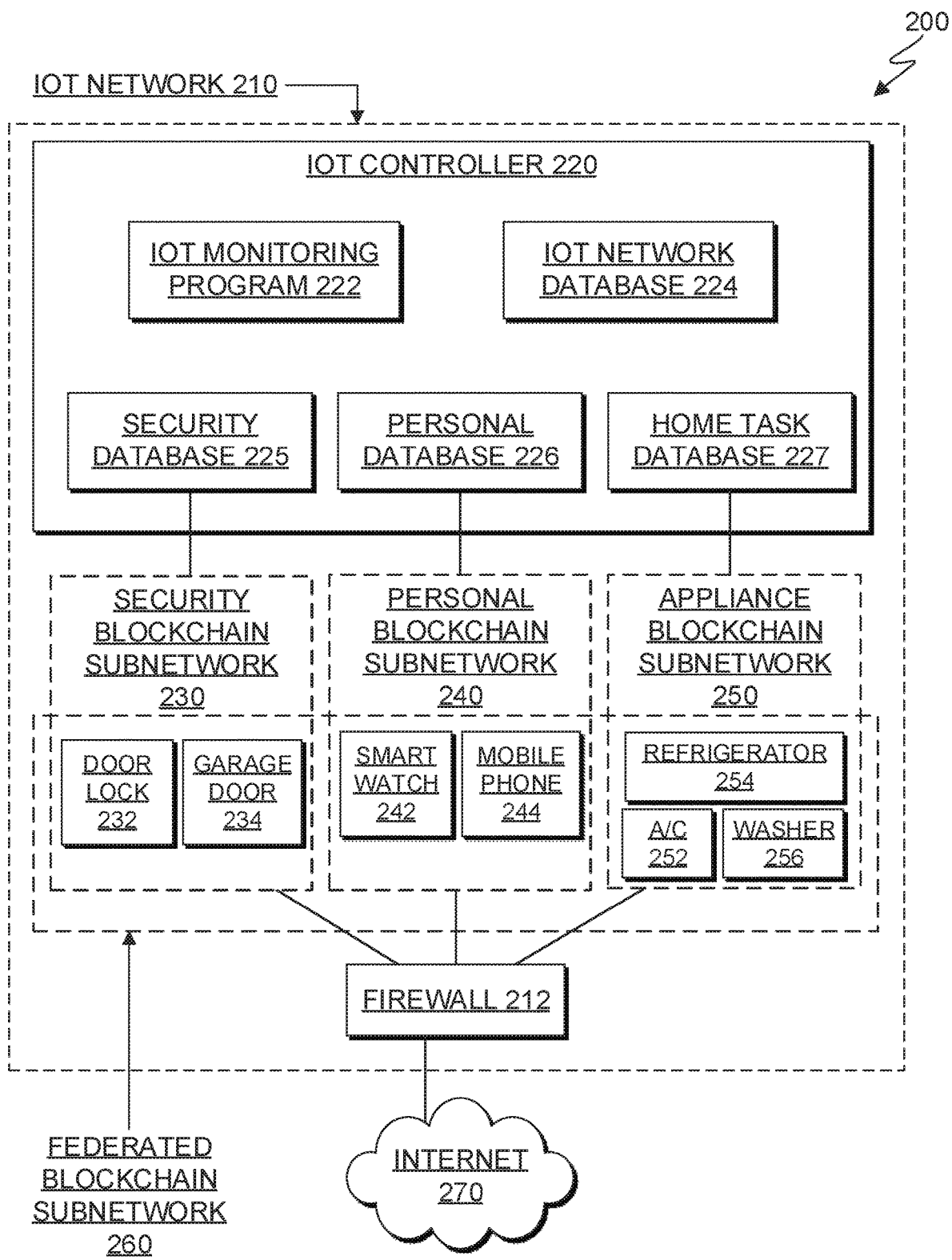
FIG. 2 depicts a block diagram of an IoT blockchain computing environment, in accordance with an embodiment of the present invention.

FIG. 2 depicts a block diagram of IoT blockchain computing environment 200, in accordance with an embodiment of the present invention. FIG. 1 provides only an illustration of one embodiment of the present invention and does not imply any limitations with regard to the environments in which different embodiments may be implemented. In the depicted embodiment, IoT blockchain computing environment 200 includes IoT controller 220, security blockchain subnetwork 230, personal blockchain subnetwork 240, appliance blockchain subnetwork 250, and federated blockchain subnetwork 260 interconnected over IoT network 270. IoT blockchain computing environment 200 may include additional servers, computers, IoT devices, or other devices not shown.

In some embodiment, IoT network 210 contains multiple blockchain subnetworks for separate categories of IoT devices and a subnetwork for a federated or private blockchain. Categories of IoT devices include, but are not limited to, physical security, personal, entertainment, and appliance. For example, the physical security category may include physical security IoT devices such as smart door locks and smart garage doors. In another example, the personal category may include personal IoT devices such as virtual assistant devices and personal mobile devices. In another example, the entertainment category may include entertainment IoT devices such as smart TVs and smart audio systems. In another example, the appliance category may include appliance IoT devices such as smart refrigerators, smart A/C units, smart washer/dryer units, and other smart home appliances. In an embodiment, IoT controller 220 creates these subnetworks of IoT devices with approval by the owner of IoT network 120 through a user interface of a computing device similar to those depicted in FIG. 1.

In the depicted embodiment, IoT network 210 includes security blockchain subnetwork 230, personal blockchain subnetwork 240, appliance blockchain subnetwork 250, and federated blockchain subnetwork 260. In the depicted embodiment, security blockchain subnetwork 230 includes door lock 232 and garage door 234. In the depicted embodiment, personal blockchain subnetwork 240 includes smart watch 242 and mobile device 244. In the depicted embodiment, appliance blockchain subnetwork 250 includes A/C 252, refrigerator 254, and washer 256. In the depicted embodiment, federated blockchain subnetwork 260 is a blockchain subnetwork for inter-category transactions.

In some embodiments, IoT controller 220 includes multiple databases, similar to database 124, in which each database separately stores certain data for each subnetwork/category of IoT devices, e.g., data for appliance category, data for personal category, data for entertainment category, data for physical security category, etc. In the depicted embodiment, IoT controller 220 includes IoT network database 224, security database 225, personal database 226, and home task database 227. For example, a credit card number can be stored in personal database 226 that only stores financial and personal data for personal blockchain subnetwork 240. In another example, finger print data can be stored in security database 225 that only stores security configurations for security blockchain subnetwork 230. In another example, A/C schedule data can be stored in home task database 227 that only stores home task data for appliance blockchain subnetwork 250.

In an example scenario for IoT blockchain computing environment 200, an IoT device is granted a one-time, temporary access to a category database different than the category the IoT device is in. In this example scenario, refrigerator 254 sends a request to IoT controller 220 for access to a credit card number to be able to make a purchase for milk. IoT controller 220 determines that refrigerator 254 is categorized in appliance blockchain subnetwork 250 and the credit card number requested is limited to IoT device in personal blockchain subnetwork 240. IoT controller 220 determines that refrigerator 254 cannot be added to personal blockchain subnetwork 240, so the data access and transaction (e.g., purchase of milk using the credit card number) using the data will be managed in federated blockchain subnetwork 260. A secure connection is created for a one-time, temporary access by refrigerator 254 to a pointer, a link to the data, to the credit card number. In the federated blockchain subnetwork 260, refrigerator 254 accesses the pointer to the credit card number through the secure connection, IoT controller 220 creates a new block (e.g., register) for the transaction, and refrigerator 254 completes the transaction—the transaction holds the temporary pointer to the credit card number and not the credit card number itself.

Figure 3:
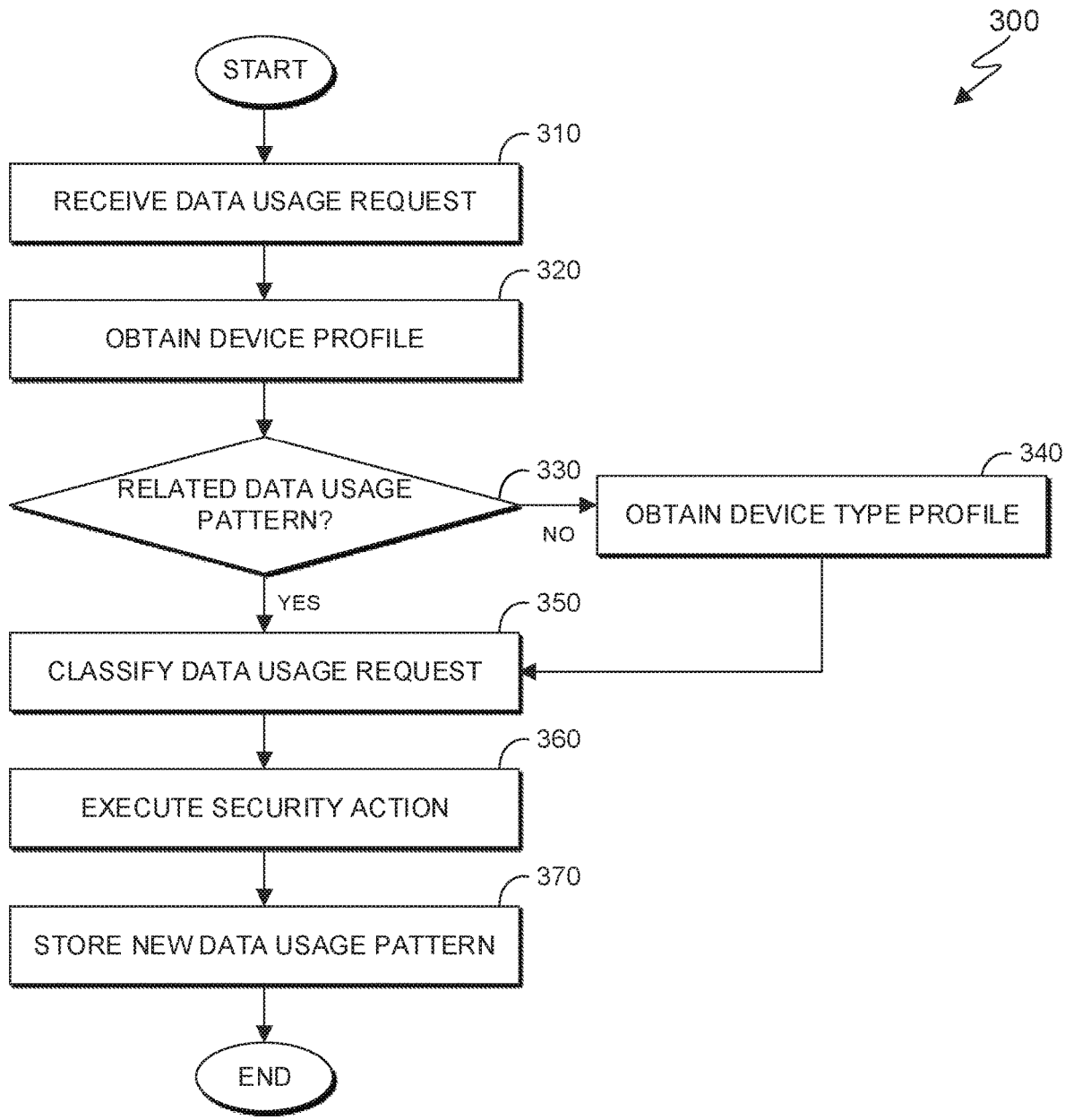
FIG. 3 depicts a flow chart of the steps of an IoT monitoring program, in accordance with an embodiment of the present invention.

FIG. 3 depicts a flowchart 300 of the steps of IoT monitoring program 122, in accordance with an embodiment of the present invention. In an embodiment, IoT monitoring program 122 receives a request for data usage, determines whether to allow execution of the data usage based on data usage patterns, and, in some scenarios, sends a notification/alert to an owner of IoT network 110 based on the determination. It should be appreciated that the process depicted in FIG. 3 illustrates one possible iteration of the process flow, which repeats for each data usage request received by IoT monitoring program 122.

In step 310, IoT monitoring program 122 receives a data usage request. In an embodiment, IoT monitoring program 122 receives a data usage request from an IoT device, such as IoT device 150, in an IoT network, such as IoT network 110. In an embodiment, IoT monitoring program 122 receives a data usage request from an IoT device, such as IoT device 140, in an IoT network, such as IoT network 110 to complete an intended use of data. The data usage request includes, but is not limited to, an IoT device identification (ID), an ID of data requested, and metadata associated with the intended use of data.

In step 320, IoT monitoring program 122 obtains a device profile. In an embodiment, IoT monitoring program 122 obtains a device profile for the IoT device that sent the data usage request. In an embodiment, IoT monitoring program 122 obtains the device profile from database 124. In an embodiment, IoT monitoring program 122 obtains an IoT device ID, an IoT device type (e.g., a smart lock), data usage patterns, and data usage models through the device profile.

In decision 330, IoT monitoring program 122 determines whether the device profile has a related data usage pattern. In an embodiment, IoT monitoring program 122 determines whether the device profile has a related data usage pattern by comparing the data usage request to data usage patterns in the device profile. In an embodiment, IoT monitoring program 122 determines whether the device profile has a related data usage pattern by comparing an IoT device identification (ID), an IoT device type, sensitive data involved, an operation to use the sensitive data, a type of operation, previous operations of the same type, date of previous and current operations, time of previous and current operations, weather and other context data of previous and current operations, affected resources, and involved users of the data usage request to an IoT device identification (ID), an IoT device type, sensitive data, an operation to use the sensitive data, a type of operation, previous operations of the same type, date of previous and current operations, time of previous and current operations, weather and other context data of previous and current operations, affected resources, and involved users of data usage patterns stored in the device profile to determine if there is a related data usage pattern.

If IoT monitoring program 122 determines the device profile has a related data usage pattern (decision 330, YES branch), then IoT monitoring program 122 proceeds to step 350. If IoT monitoring program 122 determines the device profile does not have a related data usage pattern (decision 330, NO branch), then IoT monitoring program 122 proceeds to step 340.

In step 340, IoT monitoring program 122 obtains a device type profile. In an embodiment, IoT monitoring program 122 obtains a device type profile from database 124 based on the type of IoT device that sent the data usage request. For example, if a smart refrigerator sent the data usage request, IoT monitoring program 122 obtains a device type profile for smart appliances. In an embodiment, IoT monitoring program 122 obtains the type of data that kind of device uses, the frequency of use of data that kind of device uses, and the general intended use executed with the data used by that kind of device from the device type profile.

In step 350, IoT monitoring program 122 classifies the data usage request. In an embodiment, IoT monitoring program 122 classifies the data usage request based on the data usage pattern in the device profile. In another embodiment, IoT monitoring program 122 classifies the data usage request based on the device type profile. In an embodiment, IoT monitoring program 122 classifies the data usage request as one of the following three classes normal use, block, or request approval. If the data usage request does not surpass a normal usage or request threshold, does match the related data usage pattern that allowed the intended use, and/or does match the information in the device type profile that allows the intended use, then IoT monitoring program 122 classifies the data usage request as normal use. If the data usage request surpasses a normal usage or request threshold, does match the related data usage pattern that blocked the intended use, and/or does match the information in the device type profile that blocks the intended use, then IoT monitoring program 122 classifies the data usage request as block. If the data usage request surpasses a normal usage or request threshold, does not match the related data usage pattern, and/or does not match the information in the device type profile, then IoT monitoring program 122 classifies the data usage request as request approval.

In step 360, IoT monitoring program 122 executes a security action based on the classification. In an embodiment in which IoT monitoring program 122 classified the data usage request as normal use, IoT monitoring program 122 allows the data usage request to be executed. In an embodiment in which IoT monitoring program 122 classified the data usage request as block, IoT monitoring program 122 executes one of at least three security actions, (1) blocks that IoT device's access to the IoT network, (2) removes that IoT device's access to the database, and (3) disconnects that IoT device's network access. In an embodiment in which IoT monitoring program 122 classified the data usage request as request approval, IoT monitoring program 122 sends an alert/notification to an owner's device, such as computing device 130, requesting user feedback as to what the correct classification is, block or normal use, so that the associated security actions can be taken upon receipt of the user feedback with the correct classification. In an embodiment in which IoT monitoring program 122 classified the data usage request as information, IoT monitoring program 122 send an alert/notification to an owner's device, such as computing device 130 with information about the data usage request including, but not limited to, an ID of the IoT device that requested the data usage, an ID of the intended use of data by the IoT device, a classification given, and an executed security action.

In step 370, IoT monitoring program 122 stores the data usage request and executed security action. In an embodiment, IoT monitoring program 122 stores the data usage request, executed security action, and metadata associated with the data usage request and executed security action in the device profile of the IoT device that made the request. In an embodiment, IoT monitoring program 122 stores the received user feedback in the device profile of the IoT device that made the request.

In a first example of flowchart 300, IoT monitoring program 122 receives a data usage request that has a related data usage pattern and allows the intended data usage. In this example, building personnel is attempting to unlock a smart lock on a building's front door. In step 310, IoT monitoring program 122 receives a request from the smart lock to access a schedule for personnel entrance, in which the schedule is in database 124. In step 320, IoT monitoring program 122 obtains the device profile for the smart lock from database 124. In decision 330, IoT monitoring program 122 determines the device profile for the smart lock has a related data usage pattern of the smart lock accessing the schedule for personnel entrance. In step 350, IoT monitoring program 122 classifies the request for the schedule for personnel entrance by the smart lock as normal use based on the related data usage pattern in the smart lock's device profile. In step 360, IoT monitoring program 122 allows the smart lock to access the schedule for personnel entrance. In step 370, IoT monitoring program 122 stores the request and outcome.

In a second example of flowchart 300, IoT monitoring program 122 receives a data usage request that has a related data usage pattern and blocks the intended data usage. In this example, a smart refrigerator is attempting to access a credit card number stored in database 124. In step 310, IoT monitoring program 122 receives a request from the smart refrigerator to access the credit card number stored in database 124. In step 320, IoT monitoring program 122 obtains the device profile for the smart refrigerator from database 124. In decision 330, IoT monitoring program 122 determines the device profile for the smart refrigerator has a related data usage pattern of the smart refrigerator trying to access the credit card number. In this example, the data usage pattern includes a usage threshold that would be exceeded if the smart refrigerator is allowed to access the credit card number. In step 350, IoT monitoring program 122 classifies the request for the credit card number by the smart refrigerator as block based on the related data usage pattern in the smart refrigerator's device profile. In step 360, IoT monitoring program 122 blocks the smart refrigerator from accessing the credit card number. In step 370, IoT monitoring program 122 stores the request and outcome.

In a third example of flowchart 300, IoT monitoring program 122 receives a data usage request that does not have a related data usage pattern and executes a security action based on a device type profile. In this example, a smart garage door is attempting to access a credit card number stored in database 124. In step 310, IoT monitoring program 122 receives a request from the smart garage door to access the credit card number stored in database 124. In step 320, IoT monitoring program 122 obtains the device profile for the smart garage door from database 124. In decision 330, IoT monitoring program 122 determines the device profile for the smart garage door does not have a related data usage pattern of the smart garage door trying to access the credit card number. In step 340, IoT monitoring program 122 obtains the device type profile for a physical security IoT device because the smart garage door is a physical security IoT device. In this example, the device type profile does not include this type of data usage and has no similar history of this data usage by a physical security IoT device. In step 350, IoT monitoring program 122 classifies the request for the credit card number by the smart garage door as block based on the data in the device type profile for physical security IoT devices. In step 360, IoT monitoring program 122 blocks the smart refrigerator from accessing the credit card number. In step 370, IoT monitoring program 122 stores the request and outcome.

In a fourth example of flowchart 300, IoT monitoring program 122 receives a data usage request that does not have a related data usage pattern, categorizes the request as request approval, and executes a security action based on received user feedback. In this example, a smart TV is attempting to access a credit card number stored in database 124. In step 310, IoT monitoring program 122 receives a request from the smart TV to access the credit card number stored in database 124. In step 320, IoT monitoring program 122 obtains the device profile for the smart TV from database 124. In decision 330, IoT monitoring program 122 determines the device profile for the smart TV does not have a related data usage pattern of the smart TV trying to access the credit card number. In step 340, IoT monitoring program 122 obtains the device type profile for an entertainment IoT device because the smart TV is an entertainment physical security IoT device. In this example, the device type profile does include this type of data usage but has historically classified as request approval when an entertainment IoT device requests this type of data usage for the first time. In step 350, IoT monitoring program 122 classifies the request for the credit card number by the smart TV as request approval based on the device type profile. In step 360, IoT monitoring program 122 allows the smart TV to access the credit card number based on the received user feedback. In step 370, IoT monitoring program 122 stores the request and outcome.

Figure 4:
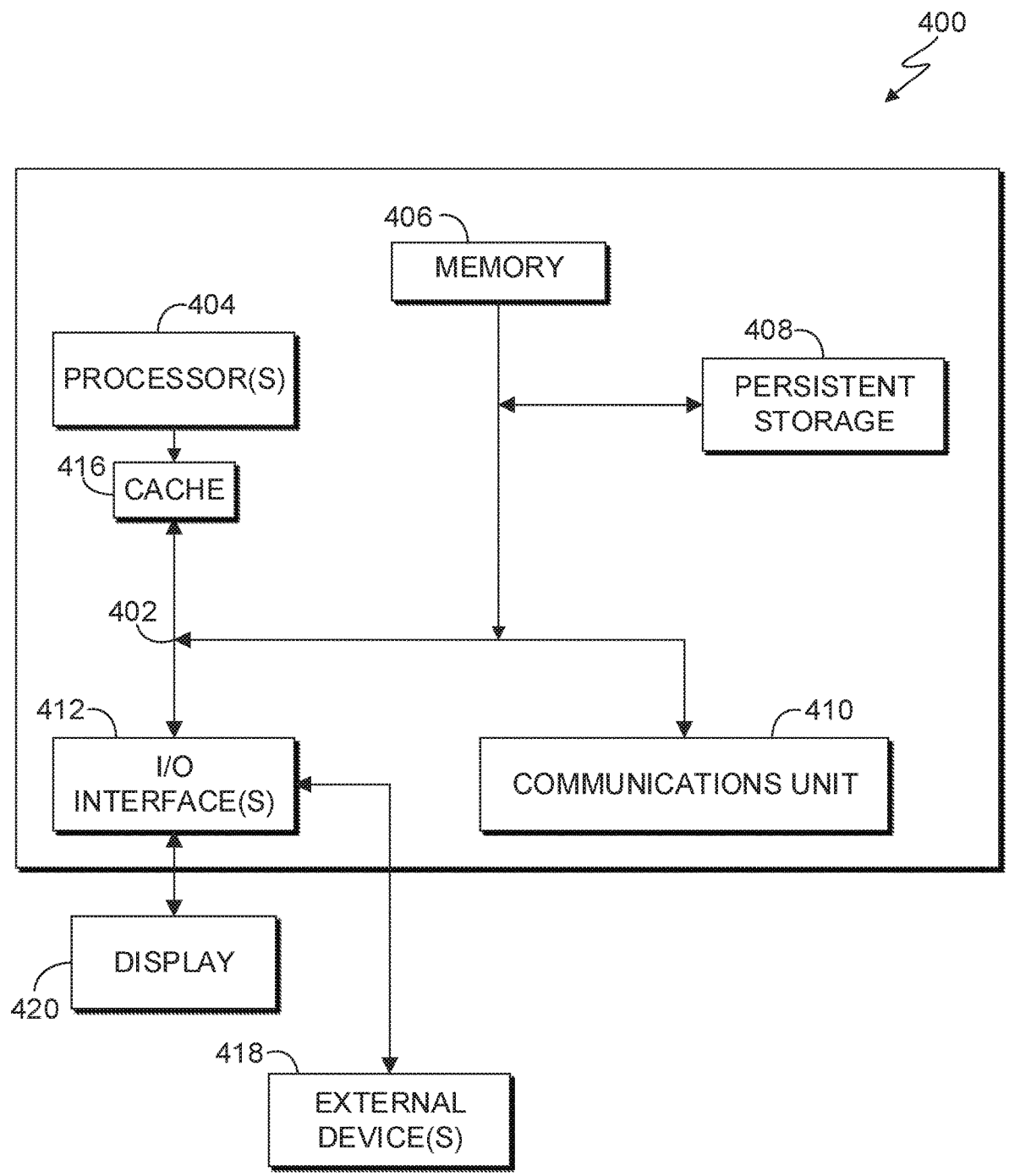
FIG. 4 depicts a block diagram of a computing device of IoT computing environment, in accordance with an embodiment of the present invention.

FIG. 4 depicts a block diagram of computer 400 suitable for IoT controller 120 and computing device 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

IoT monitoring program 122 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs, such as IoT monitoring program 122, may be downloaded to persistent storage 408 through communications unit 410.

I/O interface(s) 412 allows for input and output of data with other devices that may be connected to computing device 130 and IoT controller 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

IoT monitoring program 122 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for monitoring data usage in an Internet of Things (IoT) network by a plurality of network devices, the computer-implemented method comprising:

receiving, by one or more processors, from a network device of the plurality of network devices, a data usage request;

obtaining, by one or more processors, from a database, a device profile for the network device;

determining, by one or more processors, whether the device profile of the network device has a data usage pattern related to data requested in the data usage request;

classifying, by one or more processors, the data usage request based on a device type profile for a network device type of the network device and whether the device profile of the network device has the related data usage pattern;

executing, by one or more processors, a security action based on the classification of the data usage request;

storing, by one or more processors, the data usage request and the executed security action to the database; and in response to determining the device profile of the network device does not have the related data usage pattern, obtaining, by one or more processors, the device type profile from the database based on the network device type in the device profile, wherein the device type profile includes a type of data that type of device uses, a frequency of use of data that type of device uses, and a general intended use executed with the data used by that type of device, wherein the data usage request is classified into a specific category, the security action disconnects a network access of the network device in response to the data usage request being classified as a block class, and the device profile comprises a network device identifier, the network device type, and a set of data usage patterns.

2. The computer-implemented method of claim 1, wherein the data usage request comprises the network device identifier, a data identifier, and metadata associated with an intended usage of data identified by the data identifier.

3. The computer-implemented method of claim 1, further comprising:

comparing, by one or more processors, the data usage request to the set of data usage patterns in the device profile.

4. The computer-implemented method of claim 1, further comprising:

in response to determining the device profile of the network device has the related data usage pattern, receiving, by one or more processors, the related data usage pattern from the database.

5. The computer-implemented method of claim 1, wherein classifying the data usage request based on whether the device profile of the network device has the related data usage pattern comprises:

responsive to determining at least one of the data usage request does match the related data usage pattern that allowed an intended use of requested data of the data usage request and the data usage request does match information in the device type profile that allows the intended use, classifying, by one or more processors, the data usage request as normal use.

6. The computer-implemented method of claim 1, wherein classifying the data usage request based on whether the device profile of the network device has the related data usage pattern comprises:

responsive to determining at least one of the data usage request does match the related data usage pattern that blocked an intended use of requested data of the data usage request and the data usage request does match information in the device type profile that blocks the intended use, classifying, by one or more processors, the data usage request as block.

7. The computer-implemented method of claim 1, wherein classifying the data usage request based on whether the device profile of the network device has the related data usage pattern comprises:
responsive to determining at least one of the data usage request does not match the related data usage pattern and the data usage request does not match information in the device type profile, classifying, by one or more processors, the data usage request as request approval.

8. The computer-implemented method of claim 1, further comprising sending an alert to an owner of the network device in response to the security action disconnecting the network access of the network device.

9. The computer-implemented method of claim 8, wherein the data usage request is classified as the block class based on data in a device type profile for the network device.

10. A computer program product for monitoring data usage in an Internet of Things (IoT) network by a plurality of network devices, the computer program product comprising:
one or more computer readable storage media and program instructions stored on the one or more computer readable storage media, the program instructions comprising:
program instructions to receive from a network device of the plurality of network devices a data usage request;
program instructions to obtain from a database a device profile for the network device;
program instructions to determine whether the device profile of the network device has a related data usage pattern;
program instructions to classify the data usage request based on a device type profile for a network device type of the network device and whether the device profile of the network device has the related data usage pattern;
program instructions to execute a security action based on the classification of the data usage request;
program instructions to store the data usage request and the executed security action to the database; and
in response to determining the device profile of the network device does not have the related data usage pattern, program instructions to obtain the device type profile from the database based on the network device type in the device profile, wherein the device type profile includes a type of data that type of device uses, a frequency of use of data that type of device uses, and a general intended use executed with the data used by that type of device,
wherein the data usage request is classified into a specific category,
the security action disconnects a network access of the network device in response to the data usage request being classified as a block class, and
the device profile comprises a network device identifier, the network device type, and a set of data usage patterns.

11. The computer program product of claim 10, wherein the data usage request comprises the network device identifier, a data identifier, and metadata associated with an intended usage of data identified by the data identifier.

12. The computer program product of claim 10, further comprising:
program instructions to compare the data usage request to the set of data usage patterns in the device profile.

13. The computer program product of claim 10, further comprising:
in response to determining the device profile of the network device has the related data usage pattern, program instructions to receive the related data usage pattern from the database.

14. A computer system for monitoring data usage in an Internet of Things (IoT) network by a plurality of network devices, the computer system comprising:
one or more computer processors;
one or more computer readable storage media;
program instructions stored on the computer readable storage media for execution by at least one of the one or more processors, the program instructions comprising:
program instructions to receive from a network device of the plurality of network devices a data usage request;
program instructions to obtain from a database a device profile for the network device;
program instructions to determine whether the device profile of the network device has a related data usage pattern;
program instructions to classify the data usage request based on a device type profile for a network device type of the network device and whether the device profile of the network device has the related data usage pattern;
program instructions to execute a security action based on the classification of the data usage request;
program instructions to store the data usage request and the executed security action to the database; and
in response to determining the device profile of the network device does not have the related data usage pattern, program instructions to identify the device type profile based on the network device type in the device profile, wherein the device type profile includes a type of data that type of device uses, a frequency of use of data that type of device uses, and a general intended use executed with the data used by that type of device,
wherein the device profile comprises a network device identifier, the network device type, and a set of data usage patterns.

15. The computer system of claim 14, wherein the data usage request comprises a network device identifier, a data identifier, and metadata associated with an intended usage of data identified by the data identifier.

16. The computer system of claim 14, further comprising:
program instructions to compare the data usage request to the set of data usage patterns in the device profile.

* * * * *